United States Patent [19]
Tilley

[11] Patent Number: 5,697,758
[45] Date of Patent: Dec. 16, 1997

[54] METHOD FOR STACKING RECTANGULAR BIG BALES

[76] Inventor: Martin C. Tilley, 4775 N. 1115 E., Buhl, Id. 83316

[21] Appl. No.: 578,132

[22] Filed: Dec. 26, 1995

Related U.S. Application Data

[63] Continuation-in-part of Ser. No. 918,619, Jul. 27, 1992, Pat. No. 5,478,194, which is a continuation-in-part of Ser. No. 689,628, Apr. 23, 1991, Pat. No. 5,405,229.

[51] Int. Cl.$^6$ ..................................................... B65G 57/32
[52] U.S. Cl. ..................... 414/786; 414/111; 414/501; 414/551; 414/789.7
[58] Field of Search ............................ 414/111, 486, 414/501, 546, 551, 555, 786, 789.7

[56] References Cited

U.S. PATENT DOCUMENTS

| | | | |
|---|---|---|---|
| 3,373,882 | 3/1968 | Forest | 414/789.7 X |
| 3,521,762 | 7/1970 | Walters | 414/789.7 X |
| 3,549,023 | 12/1970 | Backman | 414/789.7 X |
| 3,596,777 | 8/1971 | Neely, Jr. | 414/789.7 X |
| 3,788,495 | 1/1974 | Fachini et al. | 414/789.7 X |
| 3,942,651 | 3/1976 | Neely, Jr. | 414/789.7 X |
| 4,604,018 | 8/1986 | Kruse | 414/789.7 |
| 5,478,194 | 12/1995 | Tilley et al. | 414/786 |

*Primary Examiner*—James W. Keenan
*Attorney, Agent, or Firm*—Ken J. Pedersen; Barbara S. Pedersen

[57] ABSTRACT

A method for picking up rectangular big bales of hay, straw, or the like; placing the bales on a turntable for proper selective orientation of the bales relative to a stacker bed; and for pivoting the turntable, with bales, about a horizontal axis for depositing the bales on a stacker bed. Sideways displacement of a first bale on the turntable permits a second bale to be placed in a side by side, parallel relationship with a first bale and also permits tying of tiers of bales on the stacker bed. A novel pick-up member, which rotates one hundred eighty degrees, allows pick up of bales from a horizontal location on the ground and placement of the bales in an upside down, lengthwise and horizontal position on the turntable.

3 Claims, 10 Drawing Sheets

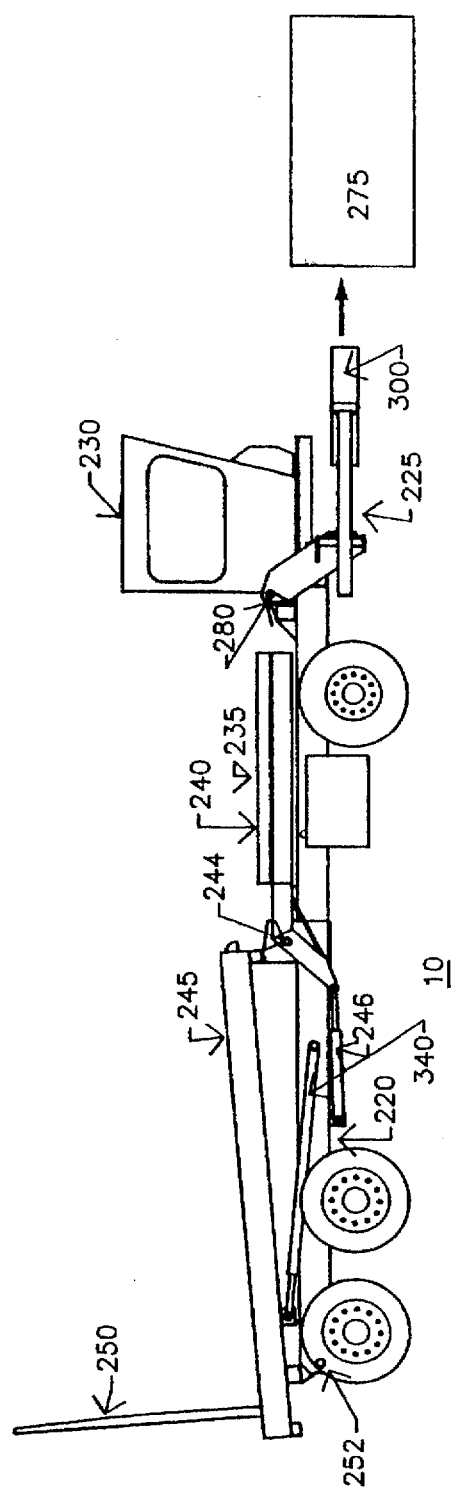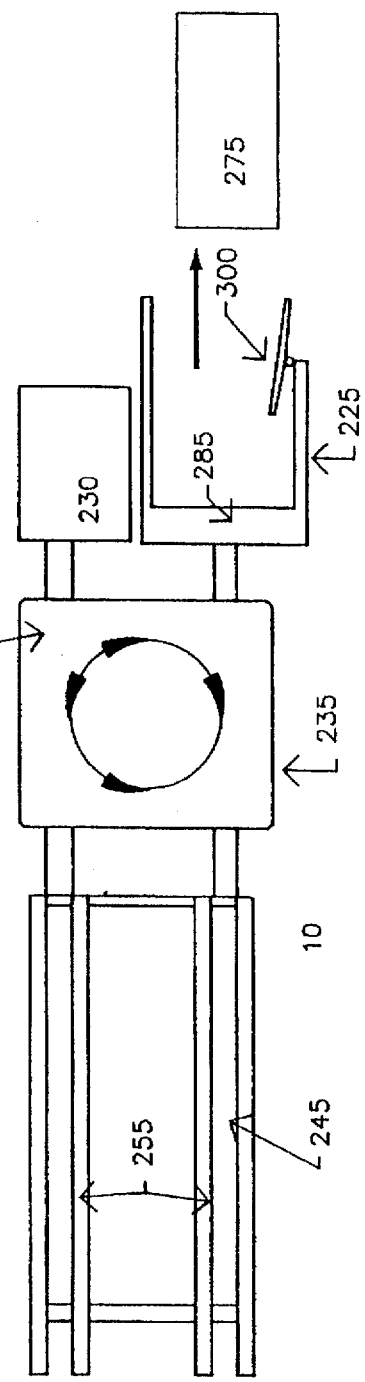

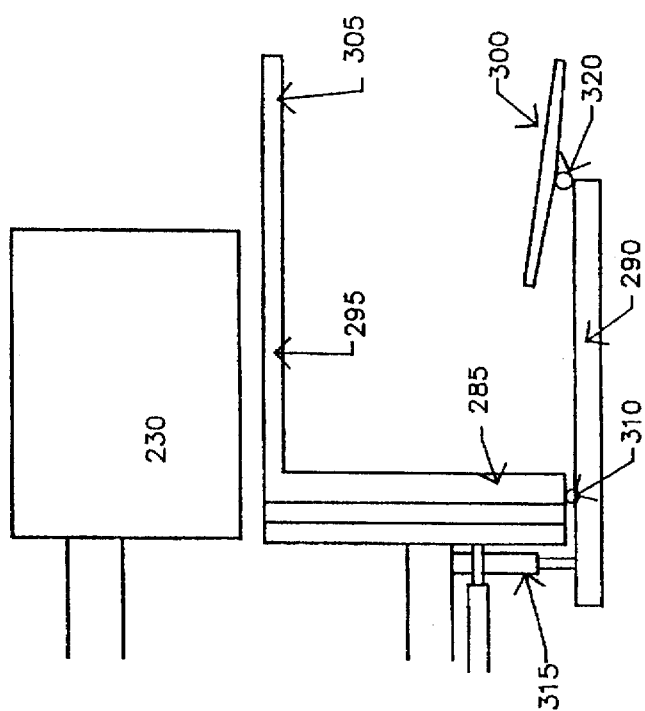
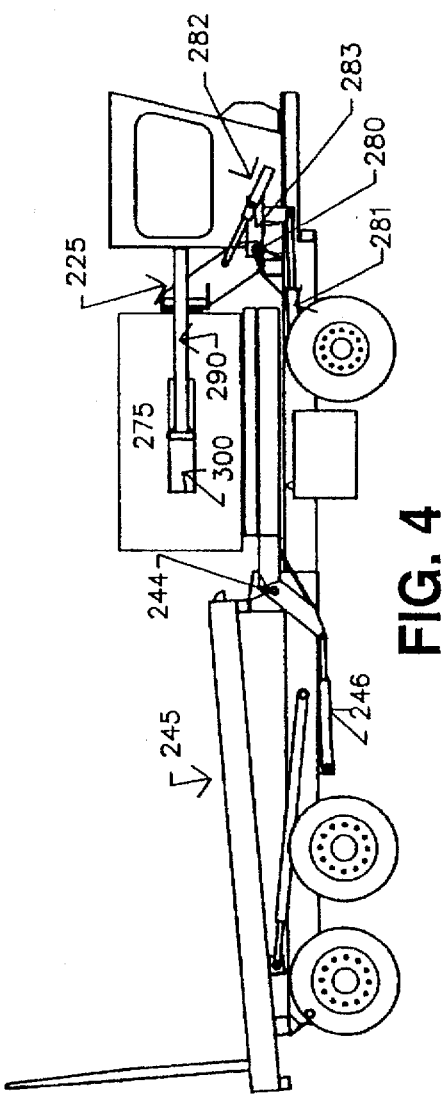
FIG. 3
FIG. 4

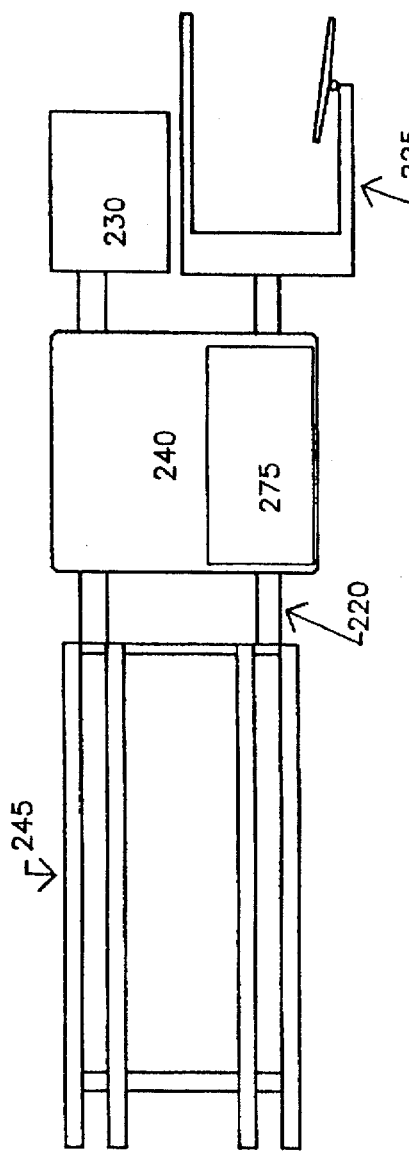
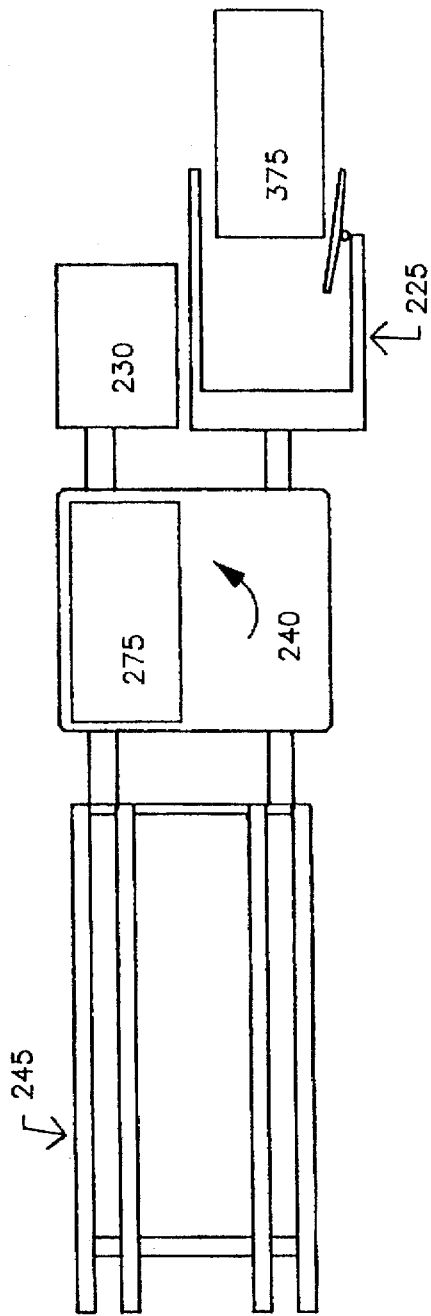

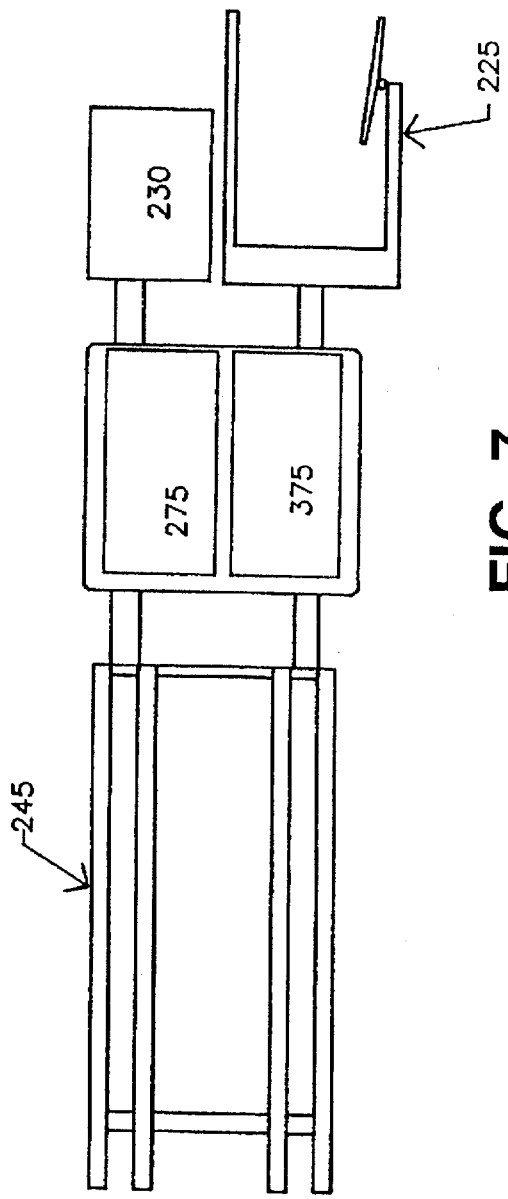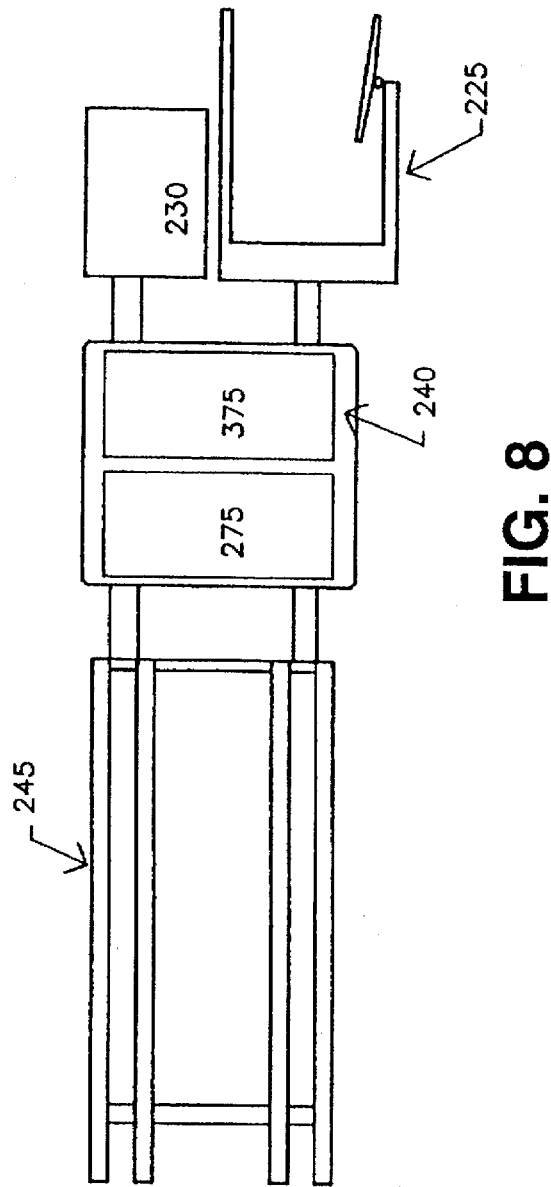

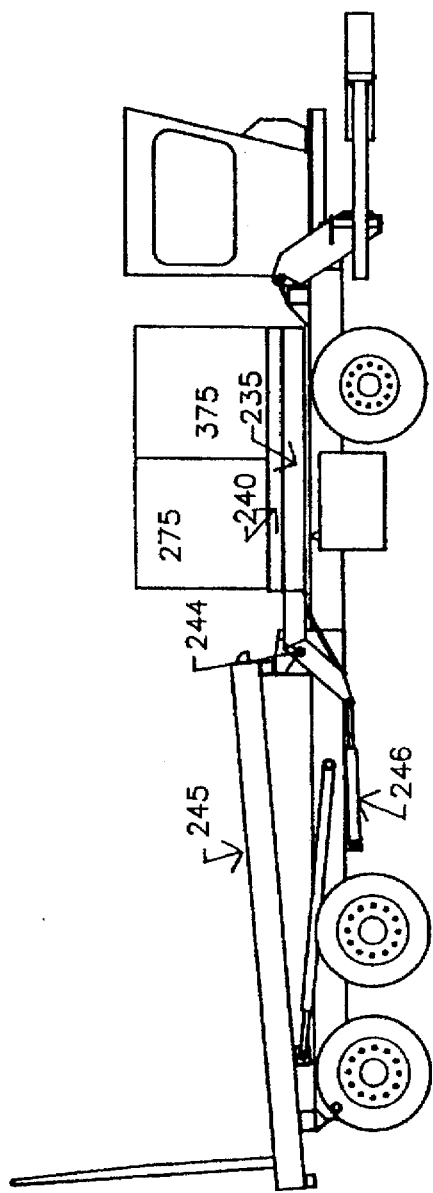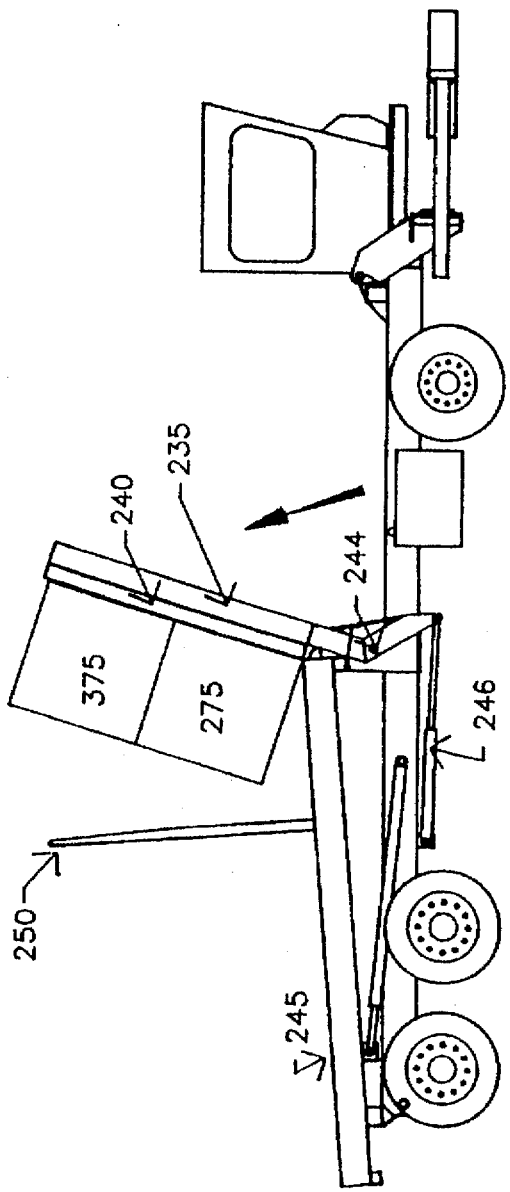

5,697,758

1

METHOD FOR STACKING RECTANGULAR BIG BALES

This application is a continuation-in-part of application filed Apr. 27, 1991, having a Ser. No. of 07/918,619, issued as U.S. Pat. No. 5,478,194 on Dec. 26, 1995, which is a CIP of Ser. No. 08/689,628, filed Apr. 23, 1991, now U.S. Pat. No. 5,405,229.

BACKGROUND OF THE INVENTION

1. Field of the Invention

The present invention relates to the field of hay harvesting, and more particularly to a method for loading, orienting and stacking big bales on a big bale stacker bed.

2. Description of the Prior Art

To obtain the maximum production from a field of hay, each crop of hay must be promptly cut, baled and removed from the field. The more quickly hay can be cut and removed, the more quickly a successive crop of hay can be cultivated.

The harvesting of hay involves three main tasks: cutting the hay; baling the hay; and removing and storing the baled hay. Although originally manual tasks, nowadays these tasks have to a great extent been mechanized. Of these three tasks, the removing and stacking of the hay bales has heretofore been the most cumbersome.

The difficulties involved in removing and stacking hay bales are to a great extent dependent on the size and quantity of individual bales produced by the specific hay baler that is used. Until recently, hay balers have come in three common sizes, producing the following sizes of bales: (1) 14" by 16" by 3 or 4 feet long; (2) 16" by 18" by 3 or 4 feet long; and (3) 16" by 24" by four feet long. These three sizes, collectively, fall into the category of "small bales". More recently, balers capable of producing bales 8 feet in length and having cross sections of 2 by 3 feet, 3 by 4 feet, or 4 by 4 feet, have been produced. The larger bales mean less time spent gathering, stacking, and moving of the bales. The primary factor limiting the use of "big bale" balers is the lack of effective machines designed to pick up, transport, stack, and retrieve the bales.

The most common method used for moving big bales from the field to a storage area is to use a tractor with a front end loader for loading of bales on a flatbed truck or trailer. Such a method requires at least two operators, i.e., one for each piece of equipment, and is time consuming.

U.S. Pat. No. 3,521,762, issued to J. C. Walters, discloses a method of loading and orienting bales on a stacker which includes the steps of receiving a bale from a stacker; rotating the bale for orientation; utilizing a first fence to move bales to a lateral location; utilizing a second fence to move the bales rearwardly onto a transfer bed; and then swinging the transfer bed up to deposit the bales onto a stacker bed.

U.S. Pat. No. 3,549,023, issued to E. Backman also discloses a method of loading and orienting bales on a stacker, including the steps of lifting a bale onto a receiving table; rotating the table to orient the bale into a lengthwise position; dumping the bale onto an elevator; raising the bale or bales into position before a vertical turntable (rotatable about a horizontal axis); grasping the bales by grasp means for holding the bales onto the vertical turntable; rotating the bales as desired; and displacing the turntable along a track for depositing the bales onto the stacker bed.

U.S. Pat. No. 4,952,111, issued to D. Callahan, discloses a stacking device for large bales. Callahan requires that bales be picked up crosswise rather than lengthwise, i.e., across an 8 foot span for proper placement directly on the stacker bed, in that Callahan has no mechanism and therefore no procedure for orientation of the bales after leaving the pickup mechanism.

U.S. Pat. No. 4,329,101, issued to A. Green et al, shows apparatus for picking up round bales and for moving the bales laterally or rearwardly, once on the stacker bed. Green does not show a mechanism or procedure for rotation of bales.

SUMMARY OF THE PRESENT INVENTION

The present invention eliminates the steps of Walters of moving bales to a lateral position off a turntable by a first fence and of moving bales by a second fence onto a transfer bed by providing a method of orienting bales which includes the steps of orienting the bales by means of a turntable and by pivoting the turntable for depositing the bales onto a stacker bed. The method of the present invention eliminates the need for the two fences of Walters and also eliminates the need for a separate transfer bed. Applicant's method further eliminates the need for the sweeper arms of Walters for aligning each bale on the turntable, as well as allowing for the orientation of two bales, simultaneously, for deposit on the stacker bed.

The method of the present invention also includes advantages over the method of Backman in eliminating the need for two separate turntables for orientation of bales; in eliminating the steps of dumping an aligned bale onto an elevator; raising the bale to the level of a second turntable; grasping of the bales by a vertical turntable; and movement of the turntable along a track for depositing the bale on the stacker bed. In providing the method of the present invention, the need for one turntable; dumping means; an elevator; grasping means; and a track for movement of the vertical turntable are also eliminated.

The novel method of the present invention includes the picking up and placement of big bales onto a turntable; rotation of the turntable for displacement of a first bale and for accommodating a second bale; selective rotation of the turntable ninety degrees for tie-in orientation; and pivoting the turntable for depositing the bales in desired orientation onto the bed of a stacker.

Also disclosed is a variation in the method of the present invention wherein the first bale placed lengthwise on the turntable is displaced sideways on the turntable by a laterally moving tab, rod or fence to make room on the turntable for a second lengthwise bale from the pickup mechanism. Then, after the second bale is placed, the turntable is rotated 90° about a vertical axis for positioning both the bales perpendicular to the stacker bed before pivoting the turntable about a horizontal axis for depositing the bales on the stacker bed. This way, the turntable need be enabled to rotate only 90°, instead of 180°, which permits a less complex, and less expensive turntable rotating means.

A more thorough description of the method of the present invention may be found in the claims appended hereto.

BRIEF DESCRIPTION OF THE DRAWINGS

FIG. 1 is a side view of the stacker of the present invention, showing positioning of the stacker relative to a big bale to be picked off the ground.

FIG. 2 is a plan view of the stacker showing rotational movement of the turntable by arrows.

FIG. 3 is a plan view of the pick up member of the stacker of the present invention.

FIG. 4 is a side view showing placement of a bale on the turntable.

FIG. 5 is a plan view of the stacker of FIG. 1, showing placement of a bale on the turntable.

FIG. 6 is a plan view showing the bale of FIG. 5, as rotatably displaced by the turntable for reception of a second bale by the turntable.

FIG. 7 is a plan view showing two bales received by the turntable.

FIG. 8 is a plan view showing the two bales of FIG. 7, now in a rotated position of ninety degrees for loading onto the bed of the stacker.

FIG. 9 is a side view of the stacker and bales of FIG. 8.

FIG. 10 is a side view of the stacker of the present invention, shown loading the big bales, as oriented in FIG. 9, onto the bed of the stacker by pivoting of the platform with turntable.

DETAILED DESCRIPTION OF THE PRESENT INVENTION

Figure 11:
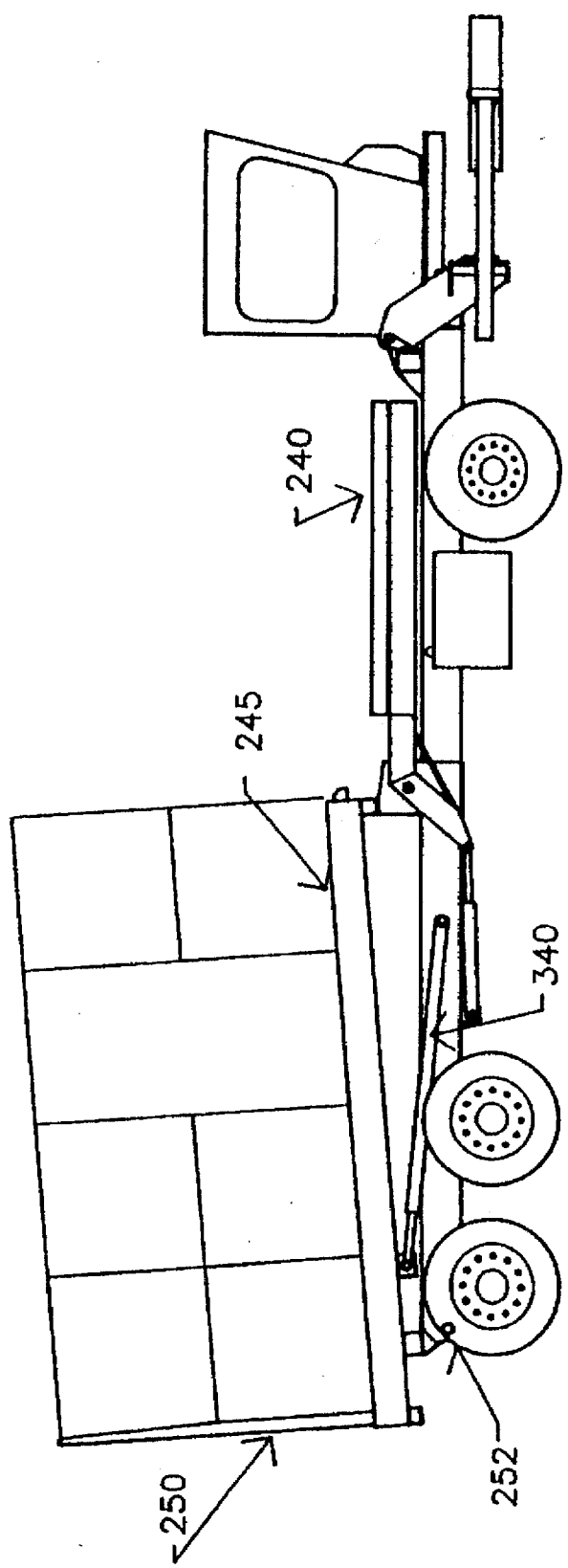
FIG. 11 is a side view showing a loaded bed with tying of tiers of big bales.

The basic components of stacker 10 of the present invention are shown in FIGS. 1 and 2. Stacker 10 is based on a truck chassis 220 with a forward mounted cab 230. The stacking system itself consists of three major components mounted to chassis 220. These three components are the pick-up member 225; the loading platform 235; and the load bed 245.

As shown in FIG. 1, pick-up member 225 is pivotably attached to the chassis 220 at pivot point 280 such that it can pivot approximately one hundred ninety degrees around pivot point 280. As shown in greater detail in FIG. 3, the pick-up member comprises a rear frame 285 which forms the basic structural backbone of the pick-up member. Two horizontal beams 290 and 295 extend forward from rear frame 285. Inner beam 295 is fixedly attached to rear frame 285, while outer beam 290 is attached to rear frame 285 by means of a pivot 310 such that outer beam 290 can swing outwardly and inwardly. A hydraulic ram 315 controls the position of outer beam 290. Jaws 305 and 300 are attached to the free ends of inner and outer beams 295 and 290, respectively. Jaws 305 and 300 essentially comprise reinforced metal plates having raised ridges or bumps on their facing surfaces, not shown, that can be used to grab and hold hay bales, as will be described in greater detail below. Inner jaw 305 is rigidly attached to inner beam 295, while outer jaw 300 is attached to outer beam 290 by means of pivot 320. A spring, not shown, biases the outer jaw towards the slightly opened position shown in FIG. 3.

As shown in FIG. 1, loading platform 235 is pivotably attached to chassis 220 at pivot points 244. Also, as shown in FIG. 1, a turntable 240 forms the greater part of the top surface of loading platform 235. Turntable 240 preferably comprises a plate approximately seven-foot square, with rounded corners. Turntable 240 can be rotated at least one hundred eighty degrees, and preferably three hundred sixty degrees by means of a hydraulic motor and drive chain assembly, not shown, mounted below the center of turntable 240. Turntable 240 is preferably supported from below by a structural steel support frame. Preferably, turntable 240 rests on plastic wear strips affixed to the top surfaces of the support frame members. Roller bearings or other friction reducing means may also be used. A pair of hydraulic rams 246, one on each side, or other actuators allow loading platform 235 to be tilted up approximately ninety degrees.

Load bed 245 comprises a flat bed pivotably attached to the back end of chassis 220 at pivot point 252. Two vertical supports 250 are mounted on rails 255 on top of load bed 245. Load bed 245 can be tilted vertically upward to unload accumulated bales of hay or retrieve previously stacked bales of hay.

The method of operation of the stacker of the present invention is shown in the figures. As shown in FIG. 1, the stacker is initially maneuvered into position so that a bale 275 is guided lengthwise into the jaw opening and such that the jaw opening of pick-up member 225 is positioned behind bale 275. It is assumed that 4 ' by 4' by 8' "big bales" are being loaded. Alternatively, the same method described can be used to load 3' by 4' by 8' bales or 2' by 3' by 8' bales, when the bales are placed side by side on edge. Stacker 10 is driven forward until the back of bale 275 contacts rear frame 285 of pick-up member 225, shown to advantage in FIGS. 2 and 3. Next, outer beam 290 of pick-up member 225 is moved inwardly such that bale 275 is clamped between jaws 300 and 305. Pickup member 225, with bale, is pivoted approximately 180° up around pivot point 280, about a horizontal axis, such that bale 275 is positioned over the right side of turntable 240 as shown in FIGS. 4 and 5. Pivoting is accomplished by hydraulic rams 281 and 282, connected between chassis 220 and pivot framework 283 and between framework 283 and member 225, respectively, as shown in FIG. 4. Outer beam 290 is moved outwardly and bale 275 is released from between jaws 300 and 305 and deposited on the right side, looking forward, of turntable 240, as may be seen in FIG. 5. After bale 275 has been deposited on turntable 240, pick-up member 225 is pivoted back to its lowered position.

As the stacker continues to move towards the next bale, turntable 240 rotates 180°, about a vertical axis, as shown in FIG. 6. Bale 275 is thereby moved over to the left side of turntable 240, freeing the right side of turntable 240 for reception of the next bale. Following the same steps, a second bale 375 is deposited onto turntable 240 next to and parallel with bale 275, as shown in FIG. 7.

As shown in FIGS. 8, 9, and 10, the bales that have been loaded onto loading platform 235 and, more particularly, upon turntable 240 are rotated 90° about the vertical axis of the turntable so as to be perpendicular to bed 245 and then deposited on load bed 245 by pivoting platform 235 approximately 90° upward around pivot point 244, having a horizontal axis. In the preferred embodiment, hydraulic rams 246, positioned on either side of loading platform 235 are used to tilt loading platform 235 into its vertical position. Thereafter, a push bar, not shown, forces this first tier of bales, i.e., stacked bales 275 and 375, and supports 250 rearward, making room for the next tier to follow. Should it be desired that the bales be tied, i.e., placed in tiers at right angles to other tiers, as shown in FIG. 11, it is only necessary to rotate the two bales making up one tier 90° about the vertical axis of the turntable, relative to the two bales making up an adjacent tier, before pivoting platform 235.

The procedure, above described, continues until the stacker bed 245 is filled. The stacked bales on the stacker are then transported to a desired location for storage. To empty the stacker, bed 245 is pivoted upwardly about pivot 252 by hydraulic ram 340. The stacker is then driven forward, such that supports 250 are withdrawn from under the stack of bales.

Figure 12:
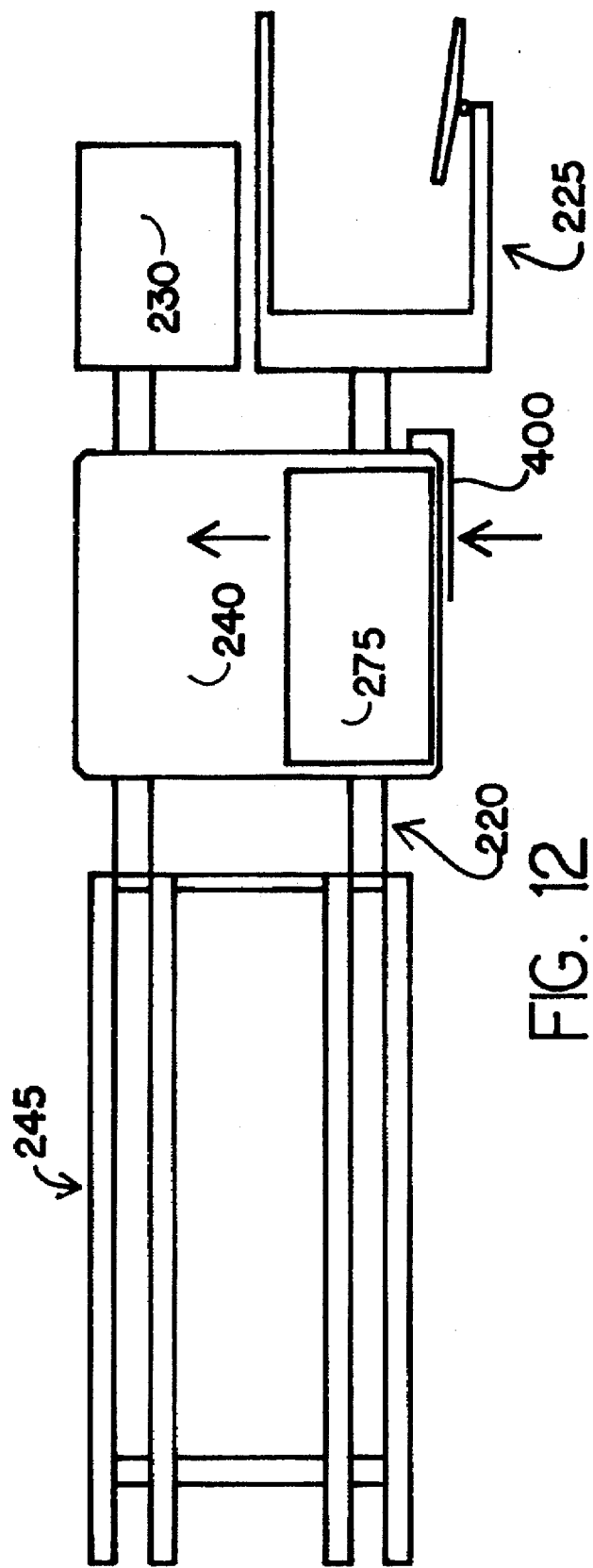
FIG. 12 is a plan view of the stacker of FIG. 1, showing placement of a first bale on the turntable, and showing a laterally moving tab, rod or fence for sideways displacement of the first bale.
Figure 13:
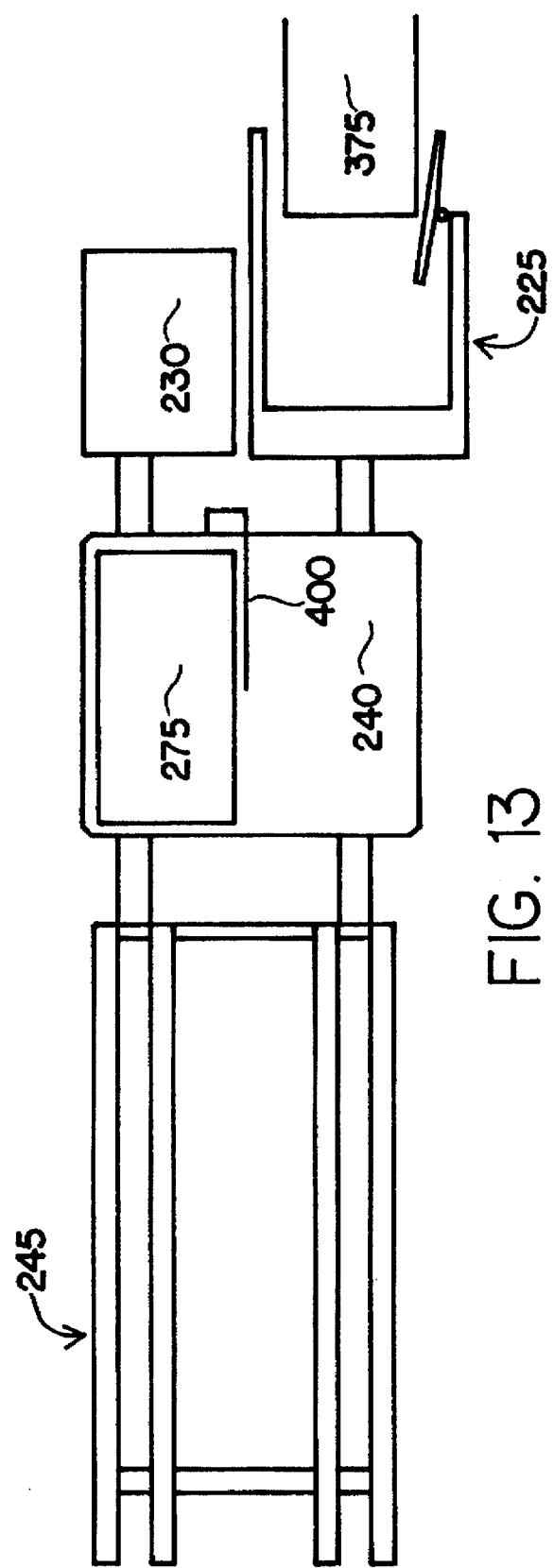
FIG. 13 is a plan view showing the bale of FIG. 12 laterally displaced by the tab, rod or fence for reception of a second bale by the turntable.
Figure 14:
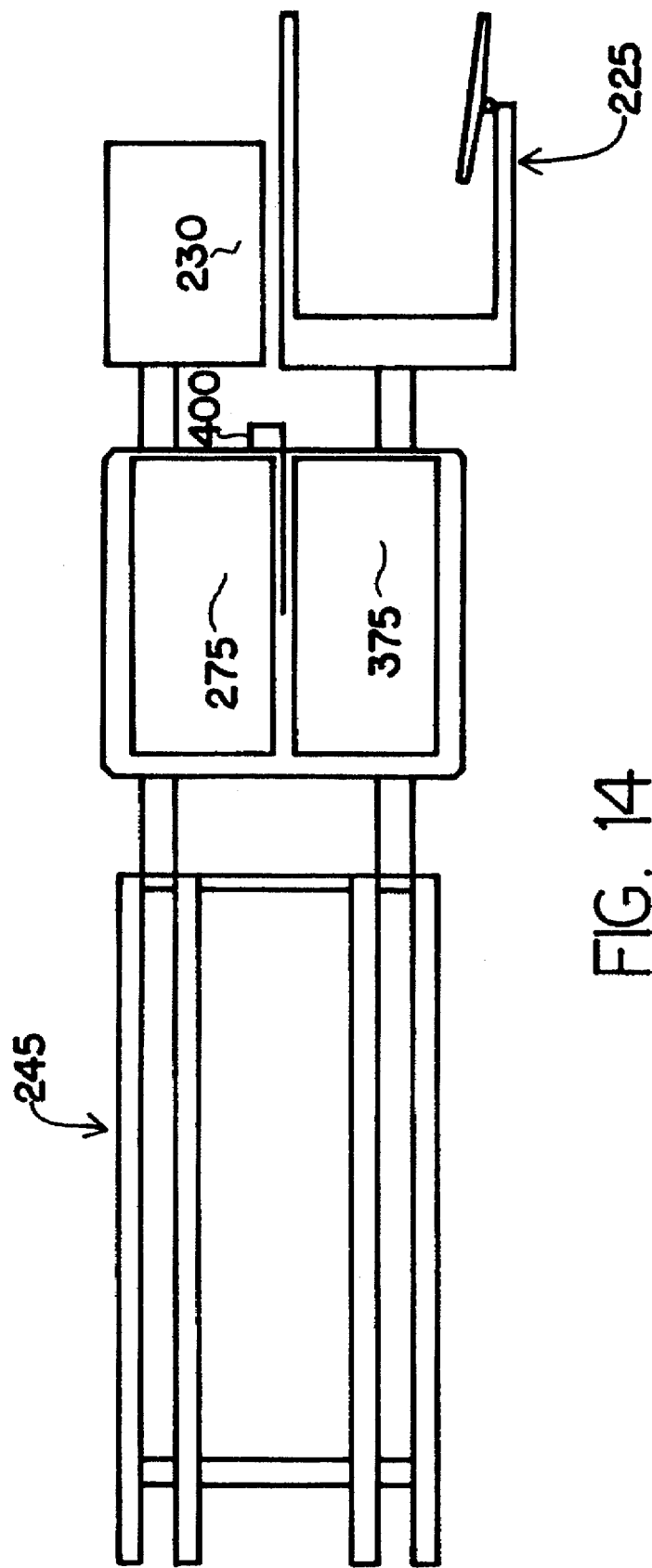
FIG. 14 is a plan view showing two bales received by the turntable.
Figure 15:
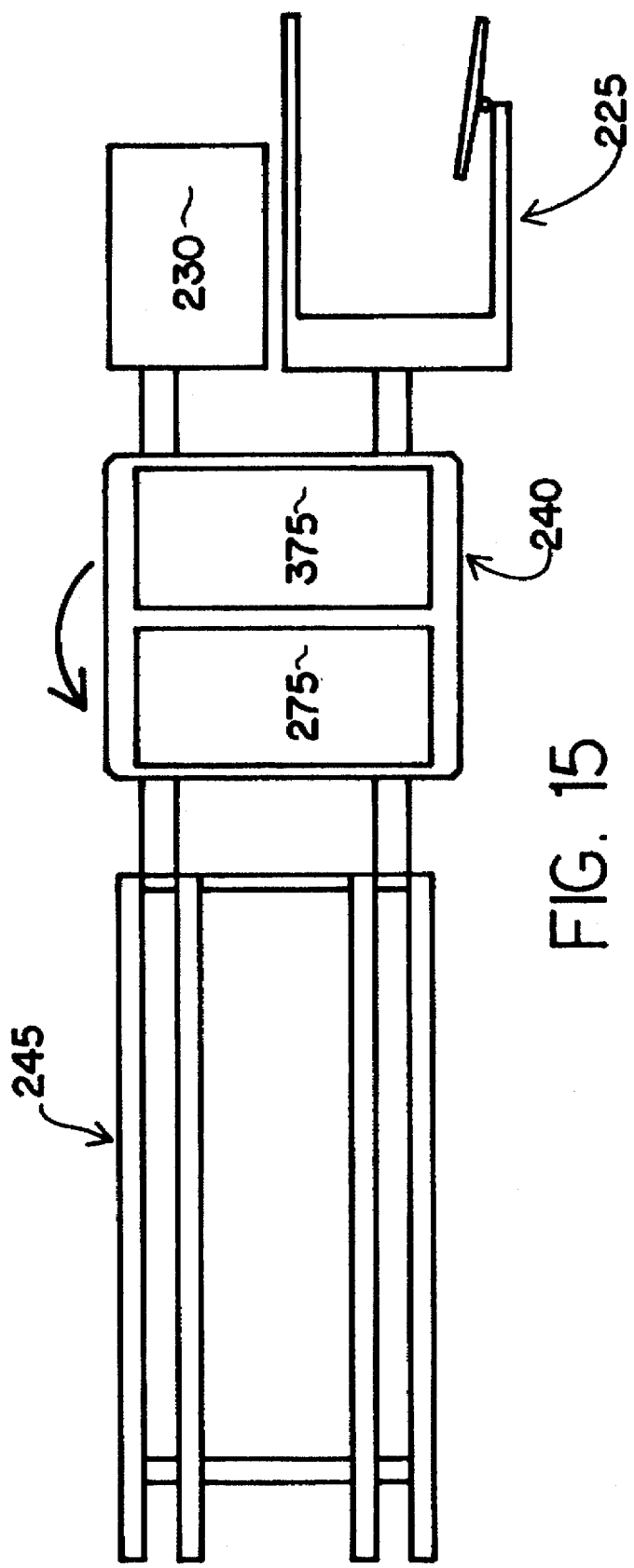
FIG. 15 is a plan view showing the two bales of FIG. 14, now in a rotated position of 90° for loading crosswise onto the bed of the stacker.

In an alternate embodiment, stacker 10 is provided with a laterally-moving tab, rod or fence 400 on or near turntable 240. Tab, rod or fence 400 is located so that it extends above at least a portion of the top surface of turntable 240, and is movable laterally over turntable 240 from near the outside of the right side to past the center of turntable 240. This way, tab, rod or fence 400 may be engaged to move a first bale placed lengthwise on turntable 240 sideways to displace the bale from the right side to the left side of turntable 240 as depicted in FIGS. 12 and 13. Then, a second bale may be placed on the now empty right side of turntable 240, and the two bales rotated together 90° for loading crosswise onto the bed of the stacker as depicted in FIGS. 14 and 15.

Laterally-moving tab, rod or fence 400 may be constructed like the first or second fences of the Walters U.S. Pat. No. 3,521,762, or in any other conventional manner. The tab, rod or fence 400 may be moved by chain and sprocket, or by a hydraulic ram cylinder. Preferably, tab, rod or fence 400 may be selectively activated for laterally displacing the first bale, and de-activated after the first bale has been displaced, or, in any event, before the two-bale set is rotated vertically for loading on the stacker bed.

Having thus described in detail a preferred method of stacking and orienting of bales according to the present invention, it is to be appreciated and will be apparent to those skilled in the art that many changes could be made in the steps of the method without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. A method for stacking bales on a stacker, said method including the steps of:

a. picking a first bale from the ground and placing the bale lengthwise on a turntable;

b. displacing the first bale sideways on the turntable with a laterally moving tab, rod or fence;

c. picking a second bale from the ground and placing the bale lengthwise on the turntable parallel with the first bale;

d. rotating the turntable ninety degrees about a vertical axis for positioning the bales perpendicular to a stacker bed for placement; and e. pivoting the turntable about a horizontal axis for depositing the bales on the stacker bed.

2. The method as described in claim 1 wherein the method of picking a first bale from the ground and placing the bale lengthwise on a turntable includes the steps of:

a. guiding the stacker to position a bale lengthwise between opposing jaws of a pick-up member; moving at least one of said jaws to clamp the bale between the jaws;

b. pivoting the pick-up member, with bale, substantially one hundred eighty degrees about a horizontal axis; and c. releasing the bale from the jaws for placement of the bale on a turntable.

3. A method for stacking bales on a stacker, said method including the steps of:

a. guiding the stacker to position a first bale lengthwise between opposing jaws of a pick-up member;

b. moving at least one of said jaws to clamp the bale between the jaws;

c. pivoting the pick-up member, with bale, substantially one hundred eighty degrees about a horizontal axis;

d. releasing the bale from the jaws for placement of the bale on a turntable;

e. displacing the bale sideways on the turntable with a laterally-moving tab, rod or fence;

f. guiding the stacker to position a second bale lengthwise between opposing jaws of a pick-up member;

g. moving at least one of said jaws to clamp the second bale between the jaws; pivoting the pick-up member, with second bale, substantially one hundred eighty degrees about a horizontal axis;

h. releasing the second bale from the jaws for placement of the bale on the turntable in a side by side parallel relationship with the first bale;

i. rotating the turntable ninety degrees about a vertical axis for positioning the bales in perpendicular orientation to a stacker bed; and j. pivoting the turntable substantially ninety degrees about a horizontal axis for depositing the bales in a stacked tier relationship on the stacker bed.

* * * * *